Aug. 13, 1968    H. HINTERTHÜR ET AL    3,396,630
STABILIZER
Filed May 25, 1966

INVENTORS
Helmut Hinterthür &
Wolfgang Pestel

BY *Spencer & Kaye*
ATTORNEYS

United States Patent Office 3,396,630
Patented Aug. 13, 1968

3,396,630
STABILIZER
Helmut Hinterthür, Hamburg-Blankenese, and Wolfgang Pestel, Hamburg, Germany, assignors to Licentia Patent-Verwaltungs-G.m.b.H., Frankfurt am Main, Germany
Filed May 25, 1966, Ser. No. 561,304
(Filed under Rule 47(a) and 35 U.S.C. 116)
6 Claims. (Cl. 89—41)

ABSTRACT OF THE DISCLOSURE

A stabilizing system wherein arrestable first positioning means are interposed between a base and a main platform and arrestable second positioning means are interposed between the main platform and an auxiliary platform, the latter carrying a gyro which is selectively connectable to either of the two positioning means. Thus, when the first positioning means are arrested and the gyro is connected to the second positioning means, there is obtained a system for stabilizing the auxiliary platform with respect to the main platform, and, conversely, when the second positioning means are arrested and the gyro is connected to the first positioning means, there is obtained a system for stabilizing the main platform with respect to the base.

---

The present invention relates to a system for stabilizing a platform with respect to a movable base.

More particularly, the present invention relates to a system for stabilizing a platform with respect to a movable base along a plurality of axes. Such a system includes elements for measuring the horizontal position as well as elements for measuring the direction, these measuring elements controlling the mechanisms which serve to change the position of the platform. The measuring elements are generally constituted by gyros. Thus, it is conventional to mount a horizontal gyro on a platform to be stabilized, the output signal of this horizontal gyro being used to control or regulate the positioning mechanism for the platform such that this platform will always be horizontal irrespective of changes of position of the movable base. In many cases, there is additionally provided a direction measuring element, which may, for example, also be constituted by a gyro, the output signal of this last-mentioned gyro being used to rotate the movable platform in the horizontal plane. Such arrangements are used, for example, in fire control systems aboard ships and also in turret control systems in tanks.

Often, however, such directional signals are used for other purposes as well, for example, if a permanent record is to be made of the course followed by a craft with the help of a recording map. Such a system then requires a separate direction measuring element. In the case of a tank, such direction measuring element would be arranged on a horizontal auxiliary platform which itself is mounted in the hull or chassis of the tank. For other purposes, it has already been proposed to mount the direction measuring element on the stabilized platform, that is to say, on the turret, assuming the latter to be a stabilized turret. In practice, however, the stabilizing system for the turret is sometimes deactivated, for example, when the tank is cruising or driven on roads. The direction measuring element would then indicate the direction, but this direction would be coupled with a gimbal error, the latter being determined by the inclination of the turret and hence of the direction measuring element itself with respect to the horizontal.

It is, therefore, the primary object of the present invention to provide a stabilizing arrangement which overcomes the above drawbacks and, with this object in view, the present invention resides in an arrangement in which the above-mentioned measuring elements are arranged on an auxiliary platform whose position can be varied with respect to the main platform. According to the present invention, the main platform is stabilized whenever the auxiliary platform is arrested, that is to say, non-movably connected to, the main platform, whereas when the main platform is arrested with respect to the base, only the auxiliary platform is stabilized.

More particularly, the present invention resides in a stabilizing system which comprises a base, a main platform and an auxiliary platform, there being arrestable first positioning means interposed between the base and the main platform, and arrestable second positioning means interposed between the main and auxiliary platforms. The auxiliary platform carries gyro means, the same being selectively connectable to either of the two positioning means. Consequently, when the second positioning means are arrested, the gyro means may be connected to the first positioning means so as to form together therewith a system for stabilizing the main platform, and with it the auxiliary platform and the gyro means carried thereby, with respect to the base, and when the first positioning means are arrested, the gyro means may be connected to the second positioning means so as to form together therewith a system for stabilizing the auxiliary platform and the gyro means carried thereby, with respect to the main platform. The practical significance of this is that the gyro means will thus always be stabilized, and if the gyro means include, besides a horizontal gyro which is used to keep the platform or platforms level, a directional gyro, the output of such directional gyro will always be free of gimbal error, irrespective of whether or not the main platform itself is stabilized. The output of the directional gyro may thus be connected to a recording map or the like which will maintain an accurate record.

According to a further feature, an elevational signal generator may be provided, the same being connectable to the second positioning means at least when the gyro means are connected to the first positioning means.

Additional objects and advantages of the present invention will become apparent upon consideration of the following description when taken in conjunction with the accompanying drawings in which.

Figure 1:
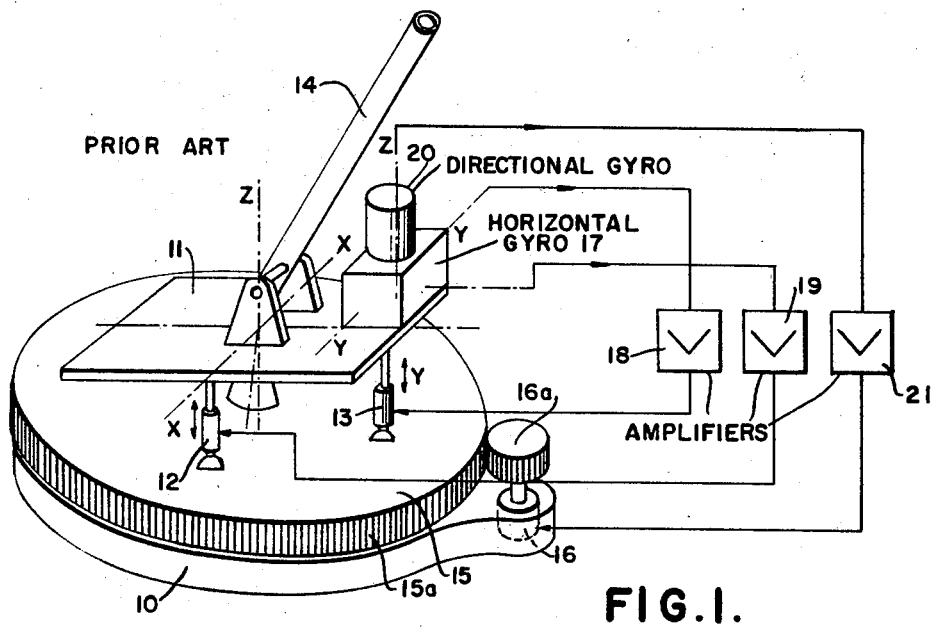
FIGURE 1 is a partly perspective and partly diagrammatic representation of a prior art stabilizing system.

Referring now to the drawings, and first to FIGURE 1 thereof, the same shows a prior art stabilizing system which comprises a movable base 10 on which is arranged a main platform 11 whose position can be varied with respect to the base 10, there being positioning means, e.g., controllable hydraulic mechanisms 12 and 13, for changing the position of the platform 11 with respect to the base 10. A gun 14 is mounted on the platform 11, it being this gun which is to be stabilized. The gun can be oriented by means of a drive 16 having a pinion 16a which is in mesh with a gear ring 15a of a turntable 15 forming part of the base. The platform 11 also carries a horizontal gyro 17 which has two outputs, namely, an x-axis output which is connected via an amplifier 18 to the positioning mechanism 13 and a y-axis output which is connected via a further amplifier 19 to the positioning drive mechanism 12, such that the main platfrom 11 is always maintained in horizontal position.

The platform 11 also carries a directional gyro 20 the output of which is connected via an amplifier 21 to the positioning drive 16, so as to rotate the turntable 15 about a z-axis, thereby to control the direction in which the gun 14 is pointed.

Figure 2:
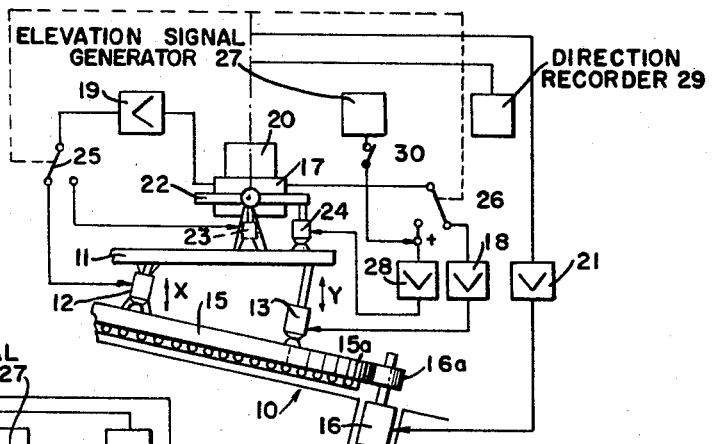
FIGURE 2 is a partly elevational and partly schematic representation of a stabilizing system according to the present invention, the same showing the positioning means between the main and auxiliary platforms as being arrested and the gyro means as being connected to the positioning means which are interposed between the main platform and the base.

FIGURE 2 shows a stabilizing system according to the present invention. Here, too, the movable main platform 11 is stabilized with respect to the base 10 by means of positioning mechanisms 12, 13, the direction of the gun (not shown in FIGURE 2) being controlled by the positioning mechanism 16, 16a acting on the geared turntable 15, 15a.

In contradistinction to the prior art stabilizing system shown in FIGURE 1, the stabilizing system according to the present invention comprises an auxiliary platform 22 which is carried by the main platform 11, the position of the auxiliary platform 22 with respect to the main platform 11 being adjustable by means of arrestable positioning mechanisms 23 and 24. The horizontal gyro 17 and the directional gyro 20 are arranged on the auxiliary platform 22. The directional gyro 20 is connected, via amplifier 21, to the positioning mechanism 16, 16a, there being a further output of the gyro 20 which is connected to a recorder 29, constituted, for example, by a map on which the travel of the vehicle carrying the arrangement is to be recorded. Also provided is an elevational signal generator 27 which is connectable, via a switch 30 and an amplifier 28, to the positioning mechanism 24 thereby to enable the platform 22 to be inclined with respect to the platform 11, as will be described below.

According to the present invention, the outputs of the gyro 17 are selectively connectable either to the positioning mechanisms 12, 13, interposed between the base 10, 15, and the main platform 11, or to the positioning mechanisms 23, 24, interposed between the main and auxiliary platforms 11 and 22. This is accomplished by switches 25 and 26, which may be ganged so as to act in unison. FIGURE 2 shows the switches 25, 26, in the position when the outputs of the gyro 17 are connected to the positioning mechanisms 12, 13, this connection being made when the positioning mecehanisms 23, 24 are arrested, at least insofar as their stabilizing functions are concerned. Consequently, the gyro 17 will stabilize the main platform 11 with respect to the base 10, 15, the auxiliary platform 22, and with it the gyros 17 and 20, moving together with the platform 11.

FIGURE 2 also shows the elevation signal generator 27 as being connected to the positioning mechanism 24, the switch 30 being closed. This allows the elevation of the gun carried by the platform 11 to be varied as needed.

Figure 3:
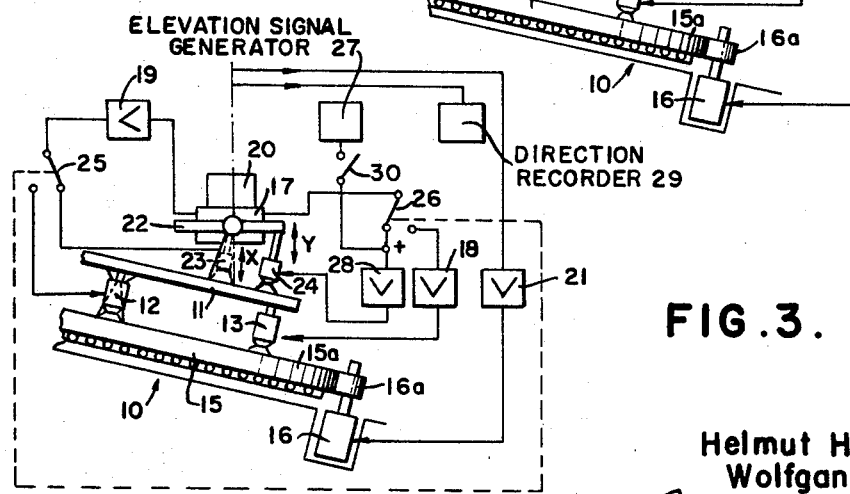
FIGURE 3 is a view similar to FIGURE 2, except that the parts are shown with the positioning means between the base and the main platform having been arrested and the gyro means being connected to the positioning means between the main and auxiliary platforms.

When the switches 25 and 26 are in the position shown in FIGURE 3, the positioning mechanisms 12, 13 are arrested, i.e., the platform 11 is not stabilized with respect to the base 10, 15. The outputs of the gyro 17 are then applied to the positioning mechanisms 23 and 24, thereby to keep the auxiliary platform 22 leveled, i.e., stabilized with respect to the platform 11, the latter itself not being stabilized. While in the specific circuit shown in FIGURES 2 and 3, the y-axis output of gyro 17 is applied to the positioning mechanism 24 via the amplifier 28 which is interposed between the elevational signal generator 27 and the positioning mechanism 24, it will readily be appreciated that the amplifier 18 could be placed between the y-axis output of gyro 17 and the switch 26, in which case the output of switch 26 would be applied directly to the positioning mechanism 24. Such an arrangement is shown insofar as the x-axis is concerned, in that the amplifier 19 is connected directly to the x-axis output of gyro 17 and the two output contacts of switch 25 are shown as being connected directly to the positioning mechanisms 12 and 13, respectively.

FIGURE 3 also shows the switch 30 as being open, thereby to disconnect the elevational signal generator 27 from the positioning mechanism 24.

It will thus be seen from the above that when the parts are connected as shown in FIGURE 2, the gyro 17 and the positioning mechanisms 12 and 13 together form a system which stabilizes the main platform 11—and with it, via the arrested positioning mechanisms 23 and 24, the auxiliary platform 22 and the gyros carried thereby—with respect to the base, and that when the parts are connected as shown in FIGURE 3, the gyro 17 and the positioning mechanisms 23 and 24 together form a system which stabilizes the auxiliary platform 22, and with it the gyros carried thereby, with respect to the main platform 11, the latter itself being arrested, via the positioning mechanisms 12 and 13, with respect to the base. Consequently, the gyros are supported on a stabilized platform, irrespective of whether or not the main platform—e.g., the turret of a tank—is being stabilized, and the output of the directional gyro will always be free of gimbal error, so that an accurate record of the travel of the tank can be maintained on the recording map or other direction recorder 29.

According to a further feature of the present invention, the positioning means interposed between the two platforms 11 and 22 may be made arrestable to impart to the auxiliary platform 22 a predetermined inclination with respect to the main platform 11.

It will be understood that the above description of the present invention is susceptible to various modifications, changes and adaptations, and the same are intended to be comprehended within the meaning and range of equivalents of the appended claims.

What is claimed is:

1. A stabilizing system comprising, in combination:
 (a) a base;
 (b) a main platform;
 (c) arrestable first positioning means interposed between said base and said main platform;
 (d) an auxiliary platform;
 (e) arrestable second positioning means interposed between said main platform and said auxiliary platform;
 (f) gyro means carried by said auxiliary platform; and
 (g) means for selectively connecting said gyro means either to said first or to said second positioning means, in consequence of which, when said second positioning means are arrested, said gyro means may be connected to said first positioning means to form therewith a system for stabilizing said main platform, and with it said auxiliary platform and said gyro means carried thereby, with respect to said base, and, when said first positioning means are arrested, said gyro means may be connected to said second positioning means to form therewith a system for stabilizing said auxiliary platform, and said gyro means carried thereby, with respect to said main platform.

2. A stabilizing system as defined in claim 1 wherein said gyro means include a horizontal gyro for maintaining the respective platforms level.

3. A stabilizing system as defined in claim 2 wherein said gyro means further include a directional gyro whose output, in consequence of the stabilization of said auxiliary platform irrespective of the stabilization of said main platform, is always free of gimbal error.

4. In combination with a stabilizing system as defined in claim 3, a direction recorder connected to the output of said directional gyro.

5. A stabilizing system as defined in claim 1, wherein said second positioning means are arrestable to impart to said auxiliary platform a predetermined inclination with respect to said main platform.

6. A stabilizing system as defined in claim 1, further comprising an elevation signal generator, and means for connecting said elevational signal generator to said second positioning means at least when said gyro means are connected to said first positioning means.

References Cited

UNITED STATES PATENTS 1,880,174   9/1932   Dugan _____ 89—41.71

BENJAMIN A. BORCHELT, *Primary Examiner.*

T. H. WEBB, *Assistant Examiner.*